Aug. 4, 1953　　　G. M. REED　　　2,647,677
AIRPLANE STEP
Filed April 28, 1951　　　　　　　　　　　　2 Sheets-Sheet 1

INVENTOR
GERALD M. REED
BY
Mason & Graham
ATTORNEYS

Aug. 4, 1953
G. M. REED
2,647,677
AIRPLANE STEP
Filed April 28, 1951
2 Sheets-Sheet 2
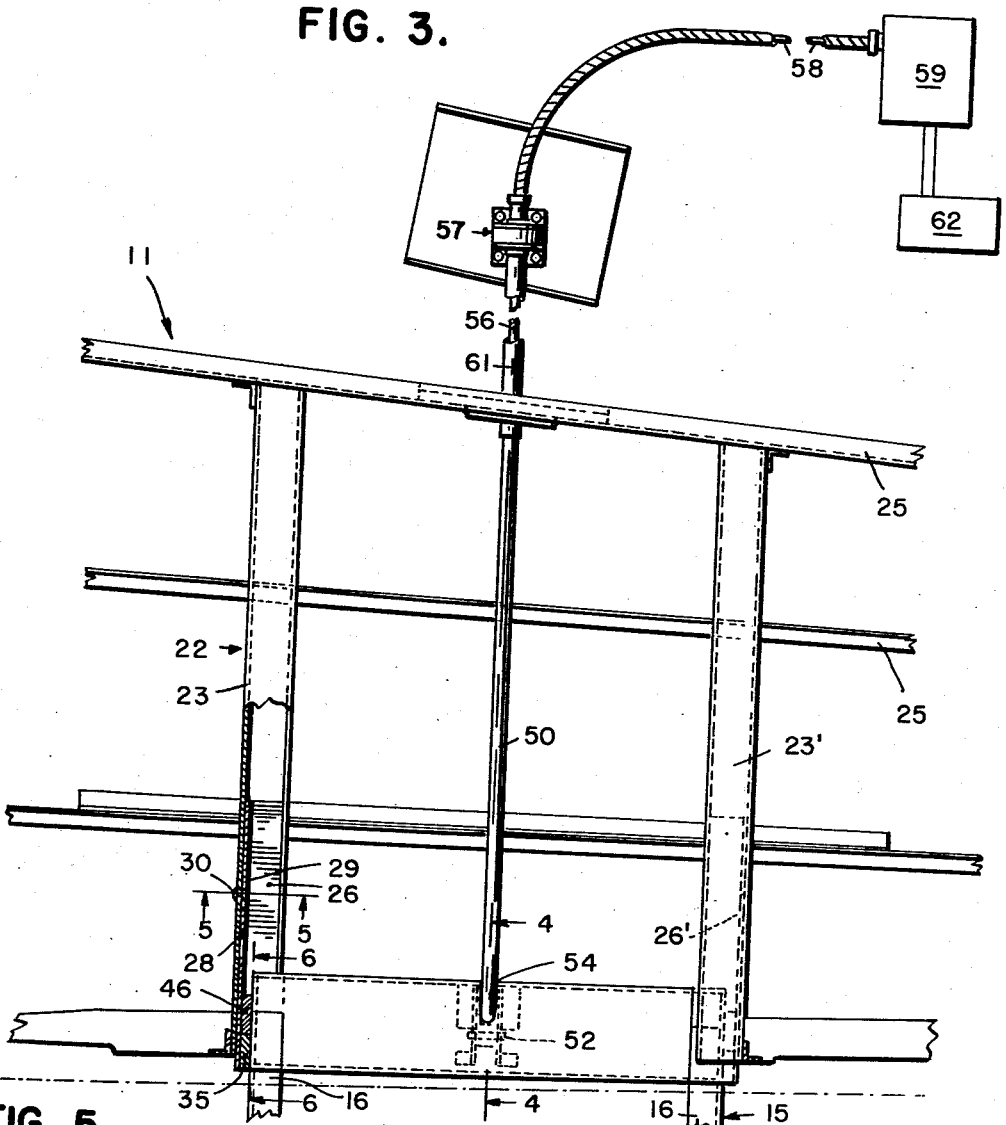
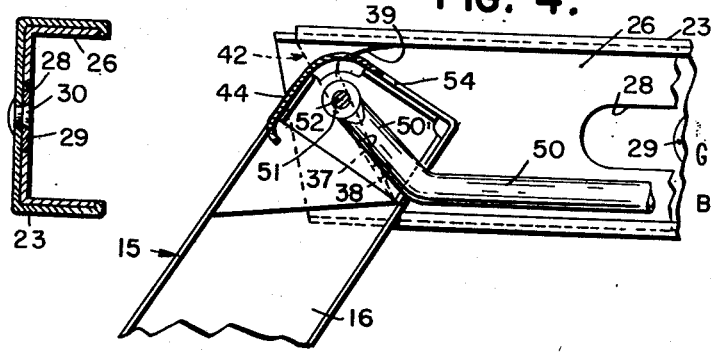
INVENTOR
GERALD M. REED
BY
*Mason & Graham*
ATTORNEYS Patented Aug. 4, 1953

2,647,677

UNITED STATES PATENT OFFICE 2,647,677

AIRPLANE STEP

Gerald M. Reed, Santa Monica, Calif.

Application April 28, 1951, Serial No. 223,470

4 Claims. (Cl. 228—48)

This invention has to do with retractable steps or stairs.

An object of this invention is to provide a novel, relatively simple, retractable step or stair assembly construction designed particularly for installation in an airplane but useful for other types of installations.

Another object is to provide a retractable step construction which is easy to operate, which operates quickly to extended or retracted position, and which affords a safe and readily usable means of entering and leaving an airplane, vehicle, building, or other object in which it is installed.

A further object is to provide a compact, retractable step assembly construction which offers a surface which is flush with the exterior body surface of the vehicle or other object in which it is installed.

Another object is to provide a construction of the type indicated which is power-driven but requires little power and which is positive in its operation.

These and other objects will be apparent from the drawings and the following description.

Referring to the drawings:

Fig. 3 is a plan view, partially broken away, showing a portion of the step assembly and showing the guide means and actuating means therefore;

Fig. 4 is an enlarged fragmentary sectional view on line 4—4 of Fig. 3;

Fig. 5 is an enlarged sectional view on line 5—5 of Fig. 3;

Figure 1:
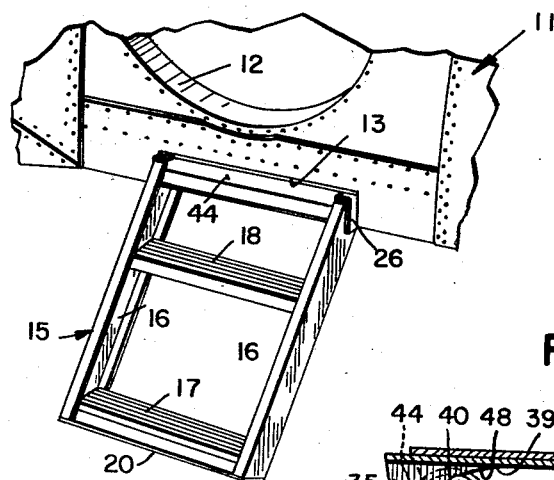
Fig. 1 is a perspective view showing the step assembly extended and, as it appears, when mounted in an airplane fuselage, the latter being fragmentarily shown.
Figure 8:
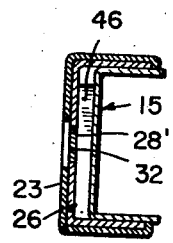
Fig. 8 is an enlarged sectional view on line 8—8 of Fig. 7.

For the purpose of illustrating and describing a preferred form of the invention I show an embodiment thereof installed in an airplane. It will be apparent, however, that the invention can be installed in other vehicles and in buildings of various types. More particularly describing the invention, reference numeral 11 generally indicates the fuselage of an airplane which is shown as being provided with a door opening 12. Below this the fuselage is provided with an opening 13 and projecting from this is shown a step or stair assembly, generally indicated by numeral 15. In Fig. 1 the step assembly is shown extended, and in Fig. 2 it is shown retracted.

Figure 2:
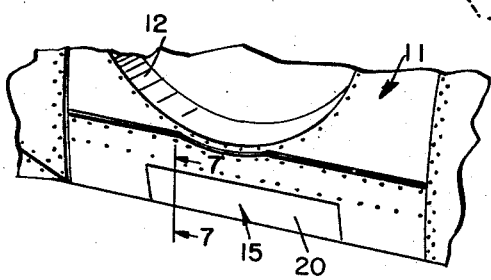
Fig. 2 is a view similar to Fig. 1 but showing the step assembly in retracted position.

The step assembly shown comprises a pair of step stringers 16 which are disposed parallel to each other, a lower step 17, and an upper step 18. Additional steps can be used as required in a given installation. The steps extend between the stringers and may be connected thereto by welding or rivets (not shown). Below the lower step there is provided a cover plate member 20 which, when the step assembly is retracted, is adapted to lie flush with the outer surface of the body of the airplane as shown in Fig. 2.

Referring now particularly to Figs. 3-8, the step assembly 15 is received within a guide means, generally indicated by numeral 22. The guide means is shown as comprising a pair of laterally spaced parallel rails, indicated by 23 and 23'. These rails are channel-shaped in cross section and are mounted substantially horizontally in the fuselage, preferably beneath the floor and may be supported upon and fastened to the conventional stringers 25.

Each of the guide rails supports a slide stop member, these being indicated by numerals 26, 26'. As appears from Fig. 5, the slide stop members are also channel-shaped and fit within the guide rails. Each slide stop member is provided with a slot 28 which receives a stop washer 29 mounted on the guide rail as by means of a rivet 30. With this construction it will be apparent that the two slide stop members are mounted for only limited movement longitudinally of the guide rails.

Figure 7:
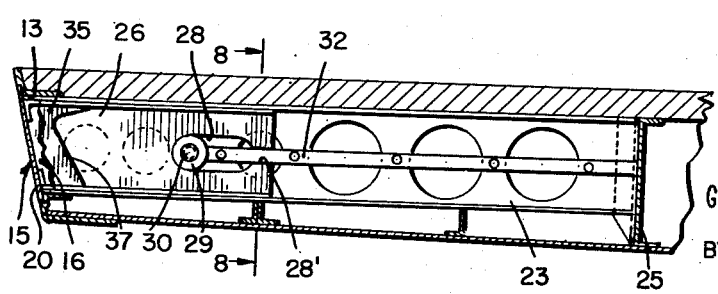
Fig. 7 is a sectional view longitudinally through the guide means and step assembly on the approximate plane indicated by line 7—7 of Fig. 3, with the step assembly retracted.

In order to provide a flush guide surface for the step assembly when it is retracted within the guide rails, each guide rail is fitted with a guide strip, indicated by 32. These guide strips are received within an extension 28' of the slots 28 when the slide stop members are in retracted position as shown in Fig. 7.

Figure 6:
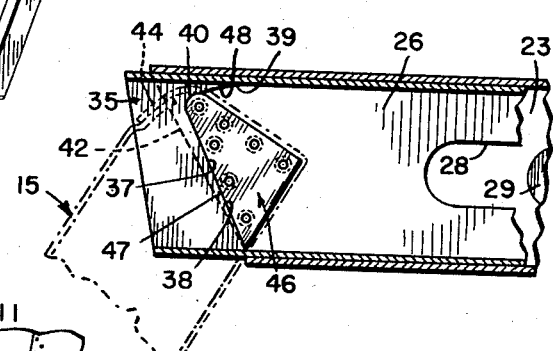
Fig. 6 is an enlarged fragmentary sectional view on line 6—6 of Fig. 3.

Each slide stop member is provided at its outer end on its inner surface with an abutment block or plate 35. As best shown in Fig. 6, each of these abutment plates is provided with a recessed inner edge 37 which includes an upwardly and outwardly inclined major surface 38 and a downwardly and outwardly inclined lesser surface 39, the two meeting in a curved connecting surface 40. The outer ends of the guide rails are cut on an angle to provide an inclined end portion 42 as best shown in Fig. 6. With the construction described, when the slide stop members are moved to their outermost position they extend beyond the guide rails.

The step assembly includes a header at the inner end, indicated by numeral 44. Formed or mounted on the header and extending laterally outwardly of the step assembly are a pair of stop abutment plates, indicated by 46. These plates, as best shown in Fig. 6, are somewhat triangular in shape and are each provided with an inclined forward edge 47 and with a rounded upper edge portion 48 adapted to fit the aforementioned edge surfaces 37 and 40 of the abutment plates 35. With this construction, when the step assembly is extended, the abutment plates on the slide stop members and on the step assembly abut and coact to limit outward movement of the step assembly. At the same time the abutment plates and the fact that the stop slide members, when extended, project beyond the guide rails permit the step assembly to pivot to the position in which the assembly is shown in Figs. 1–4 and 6.

For the purpose of actuating the step assembly I provide a jack shaft 50, which may be tubular. The outer end of the shaft, indicated by 50′, is inclined upwardly and terminates in an eye 51 mounted in the header which receives a pin 52 mounted in the header at the end of the step assembly. In this connection it may be pointed out that the header is provided with a slot 54 to receive the jack shaft and permit pivotal movement of the parts.

The inner end of the jack shaft threadedly receives a jack screw 56 which is mounted in a thrust block 57 and rotated by means of a flexible shaft 58 driven by a motor 59. Preferably a dust guard sleeve 61 is provided outwardly of the block to enclose the jack screw and jack shaft when the same is retracted.

The motor 59 is preferably a reversible D. C. motor and suitable controls, such as those indicated at 62, may be provided at a remote point from the motor as within the cockpit of the airplane.

In the operation of the device, assuming the step assembly is retracted as shown in Figs. 2 and 7, the motor is operated to rotate the jack screw and actuate jack shaft 50 which moves the step assembly outwardly in the guide rails and slide stop members. The slide stop members are carried with the step assembly from their retracted position to an extended position and the step assembly is limited in its travel by engagement of the abutment plates 46 thereon with the plates 35 of the slide stop members. As previously pointed out, the abutment plates are so shaped that they permit the step assembly to pivot downwardly under the influence of gravity to the position in which it is shown in Figs. 1, 4, and 6. To retract the step assembly, the motor is operated in a reverse direction.

In the operation of retracting and extending the step assembly, the jack shaft remains in the low position in which it is shown in Fig. 4 by reason of the inclined outer end 50′ thereof being pivotally secured to the step assembly at a point such that the axis of pivotal connection does not rise or fall during extension and retraction and pivotal movement of the step assembly.

Figure 9:
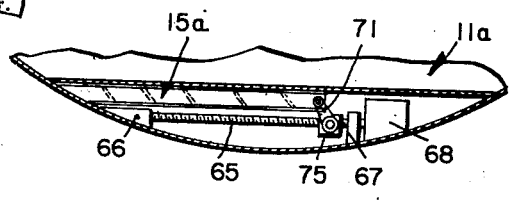
Fig. 9 is a diagrammatic view showing an alternate type of installation and actuating means.

In Fig. 9 there is diagrammatically shown another or modified form of actuating means which is designed for an installation where there is insufficient room widthwise of the airplane body for the installation of the type previously described. For example, in some airplanes the fuselage or body is relatively high off the ground, and in order to provide a stair or step assembly of sufficient length to reach the ground, the step assembly, when retracted, extends over half the width of the airplane. It will be apparent that the actuating mechanism shown or rather previously described would be unsuitable. Thus in Fig. 9 I show apparatus suitable for this purpose. The step assembly, indicated by 15a, extends more than half the width of the fuselage, which is indicated by 11a. The step assembly is mounted in the same way as previously described. In order to actuate it, I provide a screw shaft 65 extending transversely of the fuselage and mounted for rotation as in bearings 66 and 67. The shaft is driven by motor 68. A nut 70 is mounted on the shaft 65, and this is connected to the step assembly by a link 71 pivotally mounted at both ends. It will be apparent that with the construction described the nut 75 is caused to travel longitudinally of the shaft 65 when the same is rotated to thereby actuate the step assembly 15a.

Although I have shown and described a preferred and a modified form of the invention as applied to an airplane, it will be apparent that various changes and modifications can be made without departing from the invention and that the invention is suitable for installation in a variety of structures such as stationary buildings, ships, and vehicles generally.

I claim:

1. An extensible retractable step means adapted to be mounted in a structure such as an airplane, comprising a step assembly, guide means in said structure slidably receiving said step assembly wholly therein, said guide means including a pair of laterally spaced substantially horizontally disposed parallel guide rails terminating at their outer ends adjacent an outer surface of said structure and a slide stop member mounted wholly within each guide rail for limited movement longitudinally of the rail to a position projecting beyond the outer end of the rail, said step assembly being received between said slide stop members, and interengaging elements at the outer ends of said slide stop members and at the inner end of said step assembly limiting outward movement of said step assembly and permitting pivotal movement thereof relative to said slide stop members.

2. An extensible retractable step means adapted to be mounted in a structure such as an airplane, comprising a step assembly including a pair of laterally spaced parallel step stringers with steps extending therebetween, substantially horizontally disposed guide means in said structure for slidably receiving the step assembly wholly within, said guide means including a pair of laterally spaced, parallel, channel-shaped, guide rails and a pair of channel-shaped slide stop members mounted wholly therein for limited movement longitudinally thereof to a position projecting beyond the outer ends of the rails, said step assembly being slidably received between and within said slide stop members, and, when retracted, within said rails, abutment plates on the outer end portions of said slide stop members projecting laterally inwardly of the inner surfaces of said members, and laterally outwardly projecting abutment plates mounted on the sides at the inner ends of said step assembly for engaging said first-mentioned abutment plates to limit outward movement of said step assembly, said first- and second-mentioned abutment plates being shaped to permit limited pivotal movement of step assembly to a downwardly inclined position relative to said guide means.

3. An extensible retractable step means adapted to be mounted in a structure such as an airplane, comprising a step assembly, guide means in said structure including stationary elements and movable elements mounted on the stationary elements extensible to a position projecting beyond the stationary elements, said movable elements wholly receiving said step assembly, interengaging means at the inner end of said step assembly and at the outer end of said movable elements limiting outward movement of the step assembly and permitting pivotal movement thereof relative to said movable elements when the step assembly is extended.

4. An extensible retractable step means adapted to be mounted in a structure such as an airplane, comprising a step assembly including a pair of parallel stringers and steps extending therebetween, guide means mounted in the structure including a pair of parallel, laterally spaced guide rails and a slide stop member mounted within each guide rail for limited movement longitudinally of the rail to a position projecting beyond the outer end of the rail, said step assembly being received between said slide stop members and wholly within and between said guide rails, interengaging elements at the outer ends of said slide stop members and at the inner ends of said stringers limiting outward movement of said step assembly and permitting pivotal movement thereof relative to said slide stop members, said guide means having step assembly engaging means operable to prevent pivotal movement of said step assembly short of extended position of said slide stop members and said step assembly.

GERALD M. REED.

References Cited in the file of this patent

UNITED STATES PATENTS

| Number | Name | Date |
|---|---|---|
| 667,753 | Whiteley | Feb. 12, 1901 |
| 1,751,139 | Feinstein | Mar. 18, 1930 |
| 1,902,230 | Gundersen | Mar. 21, 1933 |
| 1,957,989 | Austin | May 8, 1934 |
| 2,270,735 | Knudsen | Jan. 20, 1942 |
| 2,315,110 | Dornier | Mar. 30, 1943 |
| 2,446,434 | Rechain | Aug. 3, 1948 |
| 2,487,660 | McCann | Nov. 8, 1949 |